United States Patent [19]

Emmons et al.

[11] 4,120,839

[45] Oct. 17, 1978

[54] OLIGOMERIC AMINO-CONTAINING AMINOLYSIS PRODUCTS OF POLYMETHACRYLATES OR POLYACRYLATES, AND EPOXY RESIN COATING COMPOSITIONS CONTAINING SUCH AMINOLYSIS PRODUCTS AS CURING AGENTS

[75] Inventors: William D. Emmons, Huntingdon Valley; Travis E. Stevens, Ambler, both of Pa.

[73] Assignee: Rohm and Haas Company, Philadelphia, Pa.

[21] Appl. No.: 758,894

[22] Filed: Jan. 13, 1977

[51] Int. Cl.$^2$ .................. C08F 8/32; C08L 23/36; C08L 63/00

[52] U.S. Cl. .................. 260/29.2 EP; 260/29.6 NR; 260/31.2 N; 260/31.4 EP; 260/32.4; 260/32.6 N; 260/32.8 N; 260/33.2 EP; 260/33.4 EP; 260/33.6 EP; 260/836; 260/837 R; 428/335; 526/16; 526/52.4; 526/52.5; 526/317; 526/328; 526/329.2; 526/329.5

[58] Field of Search ............ 260/32.8 N, 837 R, 836, 260/29.6 NR, 29.2 EP; 526/16

[56] References Cited

U.S. PATENT DOCUMENTS

| | | | |
|---|---|---|---|
| 2,912,416 | 11/1959 | Newey | 260/80.5 |
| 3,388,190 | 6/1968 | Bryant et al. | 260/89.7 |
| 3,406,155 | 10/1968 | Azorlosa et al. | 260/80.3 |
| 4,018,847 | 4/1977 | Messerly | 260/831 |

*Primary Examiner*—Stanford M. Levin

[57] ABSTRACT

Novel, versatile aminolysis products are obtained by aminolyzing, with a polyamine of aliphatic nature, an oligomeric homopolymer of an alkyl methacrylate in which the alkyl group contains from 1 to 6 carbon atoms or an oligomeric copolymer of at least two alkyl methacrylates, such oligomers being produced from monomeric alkyl methacrylates by anionic polymerization to provide number average molecular weights in the range of 600 to 10,000 and preferably in the range of 1,000 to 5,000. Alternatively, an anionically polymerized homo-oligomer of a ($C_1$-$C_6$)-alkyl acrylate or co-oligomer of at least two alkyl acrylates in which the alkyl in at least one monomer has from 1 to 6 carbon atoms in the co-oligomer, and the alkyl in the comonomers may have from 1 to 18 or more carbon atoms, are aminolyzed with a polyamine of aliphatic nature. Instead of oligomers obtained by anionic polymerization of esters of acrylic acid or of esters of methacrylic acid, there may be used in the aminolysis, oligomers of corresponding low molecular weight obtained by free radical polymerization, and in this version there may also be included copolymers (not obtainable by anionic polymerization) of an ester of methacrylic acid with an ester of acrylic acid and also copolymers of one or more such esters with monomers not of ester type, such as styrene. The aminolysis products have outstanding utility in the coatings field, particularly as the hardener for curing epoxy resins.

18 Claims, No Drawings

OLIGOMERIC AMINO-CONTAINING AMINOLYSIS PRODUCTS OF POLYMETHACRYLATES OR POLYACRYLATES, AND EPOXY RESIN COATING COMPOSITIONS CONTAINING SUCH AMINOLYSIS PRODUCTS AS CURING AGENTS

DESCRIPTION OF THE INVENTION

Generally the invention is concerned with the aminolysis of a group of oligomeric polymers having aminolyzable acrylate or methacrylate units or mers therein and having a number average molecular weight ($\overline{M}n$) in the range of 600 to 10,000, preferably in the range of 1,000 to 5,000, by reaction of such acryate or methacrylate oligomers with an aliphatic polyamine defined in more detail hereinafter, an example being ethylene diamine.

It has been found that aminolysis products obtained in accordance with the invention are of exceptional versatility in respect to their adaptability to use in various media. For example, in application to coating and adhesive systems based on epoxy resins, the aminolysis products of the acrylic oligomers can be used quite effectively as a curing agent in organic solvent systems as well as in aqueous systems and produced outstanding resistant epoxy resin films, coatings, and impregnants.

The aminolysis introduces an amine-containing group linked to the oligomer "backbone" or chain of carbon atoms through an amido linkage which replaces the ester linkage of an acrylate or methacrylate unit of the oligomer. The specific structure of the group and the number of amine groups therein depends on the particular aliphatic amine used in the aminolysis. The extent of aminolysis may be complete; i.e., to convert all the ester linkages in the acrylate or methacrylate units (especially in co-oligomers containing oligomer units having no ester linkages, such as styrene, ethylene, etc.) or it may be partial, especially in oligomers the units of which are entirely, or largely acrylic or methacrylic ester units.

The extent of aminolysis is generally controlled as will be explained hereinafter, by limiting the relative proportion of polyamine in relation to the number of acrylate and/or methacrylate units in the oligomer. In the aminolysis products of oligomers, predominantly or exclusively of acrylic or methacrylic esters, intended for use as curing agents in epoxy-resin coating compositions of aqueous or organic solvent type systems, the preferred proportion of amino-amide substitution is an average of from 2 to 5 such units, expressed in terms of moles of aliphatic polyamide per oligomer chain number average molecular weight. Depending on conditions surrounding or accompanying the aminolysis reaction, it may be accompanied by hydrolysis of a relatively smaller proportion of the ester units into carboxyl groups which may be neutralized by a portion of the polyamine reactant. This hydrolysis may be desirable in some aqueous systems to favor dispersing action on components of the coating system.

The products produced by the aminolysis hereinafter described include water-soluble to readily water-dispersible oligomers which contain a limited proportion of amino-amide groups providing the amine functionality capable of reacting with an epoxy resin to cure it while avoiding introducing into the cured oligomer/epoxy resin an excessive number of water-sensitive groups or linkages whereby coating and adhesive films are obtainable that have durable, weather-resistant properties. Surprisingly, the aminolysis products herein described generally have mutual compatibilities such that they can serve as a curing agent for an epoxy resin in an organic solvent medium as well as for such a resin in an aqueous system. The mixed oligomer/epoxy resin is thus amenable to serve in an organic solvent-dilutable system or to provide a water-thinnable system. An outstanding advantage of the aminolysis products described herein is the fact that it is unnecessary to neutralize them with an acid to convert the free amine group to acid salt form in order to render them suitable for either an organic solvent-dilutable system or an aqueous system.

The oligomers that are to be aminolyzed may be any low molecular weight addition polymer containing units of alkyl methacrylate, alkyl acrylate or both and having a number average molecular weight ($\overline{M}n$) in the range of 600 to 10,000, preferably in the range of 1,000 to 5,000. The oligomers may be made by anionic polymerization or by free radical initiator systems. These starting oligomers and both the anionic and free radical procedures for making them are known.

A preferred oligomeric starting material is an anionically polymerized homopolymer or copolymer of one or more esters of methancrylic acid having a number average molecular weight in the range hereinabove stated. In the case of homo-oligomers, those obtained from an alkyl methacrylate in which the alkyl has 1 to 4 carbon atoms are suitable. In the case of methacrylate co-oligomers, it is generally desirable that methyl methacrylate or a lower alkyl (having 2 to 4 carbon atoms) methacrylate be the major component of the co-oligomer and the balance of the co-oligomer units may be: alkyl methacrylate(s) in which the alkyl group is ethyl or larger when methyl methacrylate is the major component; or alkyl methacrylate(s) having a longer length than the ethyl, propyl, or butyl methacrylate, if one of the latter is the major component. Optionally, in the latter instance, a small amount of methyl methacrylate may be included for reasons mentioned hereinbelow.

The anionic polymerization of the methacrylate ester or esters is carried out in the presence of an alkoxide anion which serves as a catalyst and an alcohol, which acts as a chain-regulating agent. The reaction medium may, if desired, also contain an inert organic solvent, such as benzene, xylene or toluene. Examples of alkoxides are sodium or potassium methoxide, ethoxide or t-butoxide. The molar ratio of the chain-regulating alcohol to the total monomer charge is generally from about 1:4 to 1:50. The temperature of the reaction may be in the range of about 40° C. to 130° C. The amount of alkoxide may be from about 0.4 to about 4 mole percent. The anionically polymerized alkyl methacrylate homopolymers and copolymers disclosed in U.S. Application Ser. No. 137,057, filed Apr. 23, 1971 (now abandoned) and U.S. Application Ser. No. 371,921, filed June 20, 1973 (now abandoned) as a continuation-in-part of the earlier application made by any of the procedures described therein are satisfactory methacrylate ester oligomers to be aminolyzed in accordance with the present invention. These applications are in the hands of the same assignee as the present application and the disclosure therein of anionically polymerized methacrylates and the procedures for making them as issued in corresponding British Pat. No. 1,393,273, granted Sept. 3, 1975, is incorporated herein by reference.

Analogous oligomers of anionically polymerized (homo- or co-polymers) of one or more alkyl esters of acrylic acid are also suitable starting oligomers for aminolysis by the procedure hereinafter described. Copending U.S. Application Ser. No. 629,186, filed Nov. 5, 1975 in the hands of a common assignee, discloses suitable anionically polymerized oligomers of alkyl acrylate(s) and procedures for making them. The disclosure in Ser. No. 629,186 and in its parent U.S. Application Ser. No. 241,177, filed Apr. 5, 1972 (now abandoned) and in corresponding New Zealand Pat. No. 170,274 granted Feb. 3, 1976 and in the corresponding French publication No. 2,178,850 of corresponding French application No. 7,243,966, filed Dec. 11, 1972, of the alkyl acrylate oligomers (both homo- and copolymerized) and the various procedures for making them is incorporated herein by reference.

A third embodiment of oligomers having a number average molecular weight ($\overline{M}n$) in the range of 600 to 10,000, preferably 1,000 to 5,000, are polymers of alkyl acrylate or alkyl methacrylate or of both, with or without co-monomer(s) other than esters of acrylic or methacrylic acid, examples being acrylic acid, methacrylic acid, styrene, vinyltoluene or ethylene, using a free radical initiator in conjunction with conventional chain-regulating agents, such as mercaptans, methylene chloride, bromotrichloromethane, etc. Low molecular weight polymers having the number average molecular weight in the ranges specified above are obtained by using a large proportion of free radical initiator and/or of chain-regulating agent.

The starting oligomers of all three embodiments above contain at least 35 mole percent of at least one alkyl ($C_1$-$C_6$) methacrylate or acrylate, preferably 100 mole percent of such a methacrylate in the preferred embodiment first mentioned.

The acrylate or methacrylate oligomer is aminolyzed by a polyamine in which the amine nitrogen is attached to an aliphatic carbon atom. Various representative polyamines include ethylenediamine, diethylenetriamine, triethylenetetramine, tetraethylenepentamine, pentamethylenediamine, hexamethylenediamine, trimethylenediamine, tetramethylenediamine, menthanediamine, 4,4'-methylenebis(cyclohexylamine), bis-(aminomethyl)-cyclohexane, piperazine, N-aminoethylpiperazine, tris-(aminoethyl)amine, propylenediamine, dipropylenetriamine, tripropylenetetramine, tetrapropylenepentamine, isophoronediamine (i.e., 1-amino-3-aminomethyl-3,5,5-trimethylcyclohexane); 2,2,4-(2,4,4-)-trimethylhexamethylenediamine; 1,3-butylenediamine and 1,4-butylenediamine.

A preferred class of polyamines in respect to availability, effectiveness and economy are the alkylene polyamines of the formula:

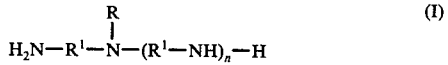
(I)

wherein $R^1$ is an alkylene group having 2 to 6 carbon atoms, R is H or —$R^1NH_2$ and n is an integer from 0 to 4.

The reaction between the acrylate or methacrylate oligomer and the polyamine is carried out by heating a mixture of the oligomer and polyamine, preferably with a catalyst in the mixture. If the mixture, when heated, is a liquid, the use of a solvent is not necessary but generally an inert (unreactive under the aminolysis conditions) solvent is useful. Examples of such solvents include aromatic hydrocarbons, such as benzene, toluene and xylene, alcohols, such as ethanol, isopropanol, ether alcohols, such as ethylene glycol, diethylene glycol, and polyols, such as ethylene glycol, diethylene glycol, and hexamethylene glycol. Solvent may be removed partially or completely by distillation during the reaction to maintain the required temperature or to exchange solvents in the reaction medium.

The temperature of aminolysis may be from about 50° to 200° C. (the reaction may be under pressure with volatile polyamines). When the oligomer contains methacrylate ester units to be aminolyzed, the preferred temperature is generally from 120° to 160° C. When the oligomer contains acrylate ester units to be aminolyzed, the preferred temperature is generally in the range of about 100° to 125° C.

Catalysts that may be used include metal alkoxides (sodium methoxide, potassium t-butoxide, etc.), metal hydroxides (sodium or potassium hydroxide, etc.), alcohols and polyols (including water), acidic materials (including ammonium salts of acids such as ammonium chloride), and bifunctional catalysts such as 2-hydroxypyridine. The proportion of catalyst, when used is from 0.1.to 20 mole percent (or more when alcohol or polyol is used to serve both as solvent and catalyst) based on polyamine.

The course of the reaction may be followed by the drop in amine titer of the reaction mixture or by the disappearance of polyalkyleneamine.

At the completion of the reaction, water or any other solvent of choice may be added to dilute the reaction mixture for packaging.

The oligomeric aminolysis products described hereinabove, and particularly those containing salt groups as well as the N-amino-substituted amide units, are utilizable as the pigment binder for coating compositions such as textile printing and dyeing compositions. Typically, such coating compositions will include the binder, pigment, and a liquid dispersing agent. They may also include other materials commonly employed in such compositions, such as extender pigments, viscosity adjusting agents, preservatives and the like.

Aminolysis products containing 0.5 to 10 meq. amine per gram of oligomer with or without 0.25 to 5 meq. COOH per gram, the latter being in the form of a salt of the polyamine used can be made from the low molecular weight oligomers by aminolysis with a polyamine without the extreme viscosity build-up or gelation which would occur in polyamine-aminolysis of conventional high molecular weight polymers of an acrylate ester or methacrylate ester. In addition, the end groups of polymers subjected to aminolysis are more reactive than internally positioned groups and in oligomers the end groups are present in greater proportion than in high molecular weight polymers. This factor facilitates the preparation of the amino-amide oligomer without gelation or excessive viscosity build-up and without the necessity to use large excesses of the polyamine to avoid such build-up with the accompanying difficulty in limiting the extent of aminolysis. The anionically produced acrylic ester or methacrylic ester oligomers are chemically unique in structural constitution; furthermore, they can be made without resorting to the use of odoriferous chain transfer agents, such as the mercaptans, to obtain the necessary low molecular weight.

The aminolysis products formed from the oligomers, especially those which contain the carboxyl groups in amine salt form, are readily water-dispersible and can be used in neutral or alkaline media so that, for the formulation of coatings based on epoxy resins, the use of strong acids, either inorganic or organic, to render the amine-containing polymer water-soluble by conversion of the basic amine groups to acid salt form can be avoided. Since, the coating with aqueous systems the use of strong acids, such as hydrochloric acid, is unnecessary, the coating compositions can be applied to metal substrates, such as of steel, wrought iron, etc., without encountering rusting or corrosion problems. Also, the alkaline systems of the present invention will tolerate reactive pigments, such as zinc oxide, which are frequently desirable for maximum corrosion resistance.

As stated hereinabove, the aminolyzed oligomers are especially useful in the preparation of coating and adhesive compositions based on epoxy resins in which the oligomer serves as a curing agent. Preferred aminolysis products for this purpose are the methacrylate ester-derived oligomers having from 2 to 5 N-aminoalkyl-substituted methacrylamide units. For example, such units may be of the formula:

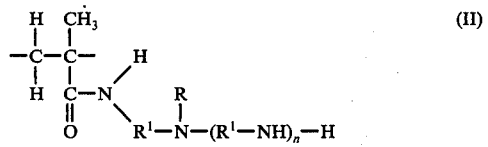
(II)

wherein R is H or $-R^1NH_2$; $n$ is 0 to 4 and $R^1$ is aliphatic hydrocarbyl, e.g., alkylene of 2 to 6 carbon atoms.

In oligomers having aminolyzed acrylate ester units, such units have analogous structure and a suitable generic representation of the structure is:

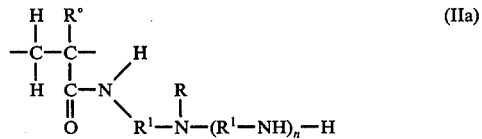
(IIa)

wherein R° is H or $CH_3$ and $n$, R and $R^1$ are as defined above.

When water is present in the solvent medium in which aminolysis of the acrylic or methacrylic ester oligomer is effected, aminolysis of the acrylic ester units is accompanied by hydrolysis of a proportion of the ester units, thereby introducing acrylic acid or methacrylic acid units. Alternatively, aminolysis in a non-aqueous medium may be followed by hydrolysis in an aqueous medium, to introduce carboxyl groups into the aminolyzed oligomer. Such acid units are neutralized by a portion of the polyamine to form internal salt (or Zwitterion) units in the aminolyzed oligomers along with the N-aminohydrocarbyl-substituted amide units. The presence of such salt units favors the water-solubility or water-dispersibility of the aminolyzed oligomer so that there may be a lower proportion of amido units to obtain a given degree of water-dispersibility in the aminolysis product. The presence of such salt units also enhances the capacity of the product to act as a dispersing agent when the coating or adhesive composition comprises a filler or pigment which must be dispersed in the composition. The relative proportion between amino-amide units and salt units in an aminolysis product of the present invention is generally from 50:1 to 1:1 weight ratio. Thus, in a specific embodiment of the invention, the oligomer having a number average molecular weight between 600 and 10,000 has an average of 0.5 to 10 milliequivalents of amine per gram (meq. amine/g.) and optionally 0.25 to 5 meq. of COOH/-gram, the carboxyl when present being in the form of a salt of the polyamine used in aminolysis.

When the acrylic ester or methacrylic ester oligomer is a co-oligomer in which a substantial proportion of hydrophobic non-ester comonomer is present, e.g., from 20% to 90% or more of the non-ester monomer, it is generally desirable to include substantial amounts, e.g., about 5% to 35% by weight, of an acid comonomer in the mixture of monomers used in forming the co-oligomer as by free radical copolymerization. In this case, aminolysis need not be effected in an aqueous medium or followed by a hydrolysis step in an aqueous medium to obtain an aminolysis product having both amino-amide units and salt units of the types mentioned above and in the proportions stated in the immediately preceding paragraph herein. When the oligomer that is aminolyzed contains methyl ester units, e.g., methyl acrylate or methyl methacrylate, transmethylation occurs, whether the aminolysis is effected in an aqueous medium or a non-aqueous medium so that some methyl ester units in the oligomer are converted to acid units, e.g., acrylic acid or methacrylic acid units.

The oligomeric aminolysis products described hereinabove are extremely useful in epoxy resin adhesive and coating compositions using either aqueous or non-aqueous vehicles. The epoxy resins that may be cured by the aminolysis products above are the resin-forming polyepoxides which generally may be defined as those which contain at least two epoxy groups in which the oxygen is attached to adjacent carbon atoms connected together in a chain by a single valence bond. These epoxy groups may be termed vic-epoxy groups. The preferred polyepoxides are those which contain a terminal epoxy group of the formula:

(III)

These preferred resin-forming polyepoxides may be termed "ethoxyline" resins and are more particularly defined as organic compounds free of functional groups other than hydroxyl and epoxy groups which contain at least two vic-epoxy groups in which the oxygen is attached to adjacent singly-bonded carbon atoms and which have a molecular weight in the range of about 250 to 5,000. The polyepoxides having epoxy equivalencies from 100 to 1025 have generally been found to have satisfactory compatibility with oligomeric aminolysis products hereindefined. Those having greater epoxy equivalencies up to about 1,500 or higher are not generally compatible but may be used when special care is taken to select components of the co-oligomer aminolyzed as well as the proportions thereof relative to polyepoxide, to provide mutual compatibility. Surprisingly, the aminolysis products which contain carboxyl groups (in salt form as discussed hereinabove) do not seriously diminish the resistance properties of the epoxy resins cured thereby.

Polyepoxides that may be used include the "ethoxyline resins" available under the trade names of D. E. R., Epon, or Araldite resins. They include polyether derivatives of a polyhydric phenol containing epoxy groups and may be prepared by effecting reaction between epichlorohydrin and a polyhydroxy phenol or alcohol, for example, hydroquinone, resorcinol, glycerine or condensation products of phenols with ketones, for instance, bis-(4-dihydroxydiphenyl)-2,2-propane. For example, the reaction of epichlorohydrin with bis-(4-hydroxyphenyl)-2,2-propane may be formulated as follows:

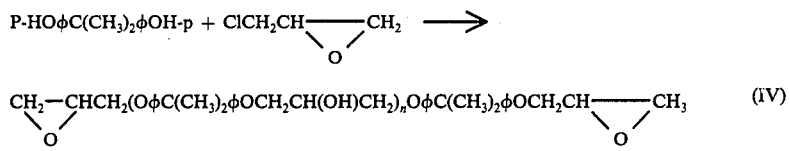

wherein φ is the phenylene group and n has an average value varying from around 0 to about 7. These resins may be made by the method disclosed in U.S. Pat. Nos. 2,324,483 and 2,444,333; British Pat. Nos. 518,057 and 579,698. Many of these ethoxyline resins are sold under the name of Epon resins or Araldite resins. Polyether polyepoxides of the following structure (V) are sold by Dow Chemical Company under the designation D. E. R. 736 ($n=4$) and D. E. R. 732 ($n=9$):

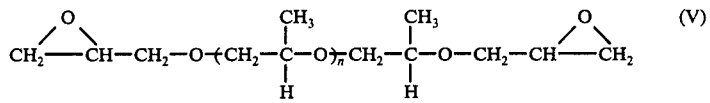

Also, there may be used polyepoxides of the formula:

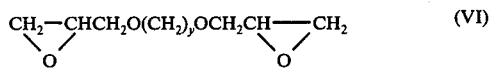

wherein y is a number having an average value of 2 to 4. Araldite RD-2 is of this type, is a liquid at room temperature and has an "Epoxide Equivalent" value of 134. Also, a diepoxide or triepoxide of glycerol may be used. These aliphatic polyepoxides may be prepared in the known fashion as described, for example, in U.S. Pat. Nos. 2,730,427 and 2,752,269. The preferred polyepoxides are those having average molecular weights of about 250 to 1,000.

Polyepoxides based on heterocyclic nuclei, such as hydantoin, are also useful such as the polyepoxides described in British Pat. Nos. 1,290,728-9, 1,304,790 and corresponding U.S. Pat. Nos. 3,629,263; 3,631,221, and 3,772,326. The hydantoin nuclei may be extended or coupled together by an oxyalkyleneoxy bridging link and the resulting extended resin may be reacted with epichlorohydrin to introduce the terminal epoxy groups. Hydantoin-based polyepoxides are available under the trade name Aracast (a registered trademark). Methods for making them are disclosed in patents, of which the three U.S. patents mentioned are representative.

There may also be used as the polyepoxide component, addition copolymers of glycidyl acrylate, glycidyl methacrylate, glycidyl vinyl ether, or glycidyl vinyl sulfide with other monoethylenically unsaturated comonomers containing a group of the formula $H_2C=C<$, such as a ($C_1-C_{18}$) alkyl ester of acrylic acid or of methacrylic acid, styrene, vinyl acetate, acrylonitrile, and vinyl chloride. The copolymers may contain up to 40% by weight of one or more of the glycidyl esters or ethers, and preferably contain about 10% to 30% by weight thereof.

Any suitable concentration of the mixture of the polyepoxide and aminolyzed oligomer in the solvent may be employed such as from 1 to 50% by weight. If a pigment is present, the total solids concentration in the coating composition may be from 5 to 75% by weight. The ratio of pigment to binder (using the latter term to embrace the polyepoxide and the aminolyzed oligomer) may be from 1:20 to 20:1.

The solvents that may be employed include such hydrocarbons as benzene, toluene, xylenes, and aromatic naphthas or mixtures of such solvents; esters such as ethyl, butyl, amyl, ethoxyethyl or methoxyethyl acetates, lactates, or propionates; ketones such as acetone, methyl isopropyl ketone, methyl isobutyl ketone, isophorone and cyclohexanone; alcohols such as n-butanol, t-butanol, isopropyl alcohol, n-propyl alcohol, amyl alcohols and cyclohexanol; ethers, such as diethyl ether, dioxane, the monoethyl ether of ethylene glycol, the monomethyl ether of ethylene glycol and the monobutyl ether of ethylene glycol; and miscellaneous solvents including dimethylformamide, dimethylacetamide, acetonitrile, nitromethane, nitroethane, nitropropane and nitrobutane; as well as mixtures of two or more solvent materials either from the same group or any or all of the groups just listed.

In the case of water-thinnable systems, the water-miscible solvents, such as the alcohols, polyols and ether-alcohols, mentioned are particularly useful.

The polyepoxide coating and adhesive compositions of the present invention may be formulated as two-package or two-component systems wherein one of the packages comprises the aminolyzed oligomer and suitable solvent, and optionally, pigments, levelling agents, anti-foam agents, and other modifiers and the second package or component comprises the epoxy resin, optionally with a suitable solvent such that the two components are compatible when blended shortly before used as a coating or adhesive. The polyepoxide should be blended with the aminolysis oligomer product in such relative proportions as to provide from 25 to 75 amine equivalents to 75 to 25 epoxy equivalents, and preferably a stoichiometric equivalent of amine to each equivalent of epoxide, i.e., 50:50.

To extend the pot-life or the "open" time of such compositions after blending, especially in aqueous sytems, a volatile ketone or aldehyde may be included as a solvent or a component of the solvent. The latter may be added to the package containing the aminolysis oligomer product so that it is carried with the latter into the blend when it is mixed with the second package containing the epoxy resin. The proportion of aldehyde or ketone may be up to one, or more than one, equivalent weight of oxo groups for each equivalent of amino nitrogen in oligomer. Suitable aldehydes include formaldehyde, acetaldehyde, propionaldehyde, butyraldehyde, etc., and suitable ketones include acetone, methyl ethyl ketone, methyl isopropyl ketone, and methyl amyl ketone. Such ketones or aldehydes presumably function as reversible blocking agents via imine formation from the primary amine groups. When the coating cured, it is believed that the ketone or aldehyde is volatilized and the amine group is regenerated.

The following examples are illustrative of the aminolysis products and epoxy resin coating and adhesive compositions, the temperature being in ° C. and the parts and percentages being by weight unless otherwise stated. The term "dp" refers to "degree of polymerization" and is followed by a number indicating the number of monomer units in the oligomers determined by gel permeation chromatography.

EXAMPLE 1

(a) A pre-dried 3-liter, 4-neck, round-bottomed flask is fitted with a thermometer, a "thermowatch" (i.e., a thermostat control), a nitrogen inlet, a heating mantle atop a pot-lifter, a 1000 ml pressure-equalizing addition funnel, a water-cooled condenser, and a mechanical stirrer. The flask is charged with 236 g. xylene, 32 g. methanol (1.0 mol), and 25.2 g. potassium t-butoxide (0.22 mol) and warmed to 60° C. At 60° C. a mixture of 152.0 g. butyl methacrylate (1.07 mol) and 455.8 g. methyl methacrylate (4.56 mol) is added dropwise. Little external heating is necessary to maintain the temperature of the reaction mixture between 65°-70° C. A mild exotherm occurs during the monomer addition. Approximately 1 hour after addition of monomers is completed a sample is removed, quenched with a few drops of trifluoroacetic acid and analyzed by glc. Only a few percent residual monomer is observed by this method of analysis. Addition of a mixture consisting of 236 g. xylene, 152.0 g. BMA (1.07 mol) and 455.8 g. NMA (4.56 mol) is made at a rate which sustains a mild exotherm (temperature is maintained at ~70° C. with but little external heating). Approximately 1 hour after addition of the monomer mixture is completed a sample of the orange liquid shows essentially no residual monomer by glc analysis. The product (1745 g. at 72% solids), upon analysis by gel permeation chromotography, has an $\overline{M}w$ of 1440 and $\overline{M}n$ of 1220, with $\overline{M}w/\overline{M}n$ equal to 1.18.

(b) A one-liter, four-necked, round-bottomed flask equipped with an addition funnel, a mechanical stirrer, a thermometer, a "Thermowatch", an oil bath utilized with a pot-lifter, and a variable take-off distillation head is charged with 608.8 g. (3.98 mols, 72% solids in xylene) of the co-oligomer of 75% methyl methacrylate (MMA) and 25% butyl methacrylate (BMA) prepared in part (a), 82.6 g. (0.80 mol) of diethylenetriamine (DETA) and 44.0 g. (8.4 wt. % on solids) of butyl Cellosolve (BC). The reaction mixture is brought to 140° C. with a pre-heated oil bath. This temperature is then maintained by removal of solvent and by-products during the course of the reaction. Xylene is added whenever necessary to keep the viscosity of the mixture within reasonable limits. When the loss of amine titer reaches 35–40% of the initial charge (13 hours), heating is terminated. The oil bath is removed and xylene is distilled under reduced pressure (above 100 mm Hg) as the temperature of the mixture drops from 140° to 80° C. When the solids content of the reaction mixture reaches 85–90%, water (about 550 g) is added gradually at 80° C. The product is recovered as an aqueous solution with the following specifications (the low molecular weight polyamine therein having an amido functionality of about 2.4):

| Solids | 40.8% |
|---|---|
| Viscosity (Brookfield, Spindle 4, 6 RPM, 25° C.) | 21,000 cps |
| Amine Equivalent Weight | 877 |
| Total Titer | 1.82 meq/g |
| Acid Number | 38.1 |

EXAMPLE 2

The procedure described in Example 1 (b) is followed. After 12 hours heating at 140° C., the amidation reaction is terminated by cooling to 80° C. In this example, no water is added to dilute the polyamine; instead, butyl Cellosolve (about 200 g.) is used to reduce the viscosity of the product, which has the following specifications (and an amido functionality of 2.4).

| Solids | 57.5% |
|---|---|
| Viscosity (Brookfield Spindle 4, 1.5 RPM, 25° C.) | 40,000 cps. |
| Amine Equivalent Weight | 694 |
| Total Titer | 1.93 meq/g. |
| Acid Number | 27.5 |

EXAMPLE 3

(a) A butyl acrylate (BA), oligomer of dp about 11 ($\overline{M}w=3,200$, $\overline{M}n=1380$) is prepared as follows: A 2-liter, 3-neck, round-bottom flask equipped with thermometer, stirrer, reflux condenser, and nitrogen inlet is charged with 15.3 g. of potassium tertiary-butoxide and 99 g. of toluene. The addition of 875 g. of butyl acrylate is made over 1 hour; external cooling is applied as necessary to maintain the temperature at 70° C. After 4 additional hours at 70° C., the toluene and unconverted butyl acrylate is removed at reduced pressure. A total of 830 g. of oligomeric butyl acrylate is obtained.

(b) To a stirred flask is added 192.0 g. (1.5 mol) of the oligomeric BA, 34.3 g. (0.33 mol) of diethylenetriamine, and 20.0 g. (8.8 wt. % on solids) of butyl Cellosolve. The reaction temperature is maintained at 110° C. and the product is recovered as a solution in butyl Cellosolve with the following specifications:

| Solids (125° C./1 hr.) | 78.3% |
|---|---|
| Amine Equivalent Weight | 373 |
| Acid Number | 3.4 |
| Amido-functionality | 3.4 |
| Total Titer | 2.74 meq/g. |

EXAMPLE 4

(a) A 3-liter, four-necked, round-bottomed flask equipped with a mechanical stirrer, a thermometer, a "Thermowatch", an oil bath utilized with a pot-lifter, a pressure-equalizing addition funnel and a variable take-off distillation head protected with a Dewar condenser, is charged with 250 g. of butyl Cellosolve. The system is sparged with nitrogen and heated to 150° C. To the flask is then added a solution of 250 g. BMA (1.76 moles), 750 g. MMA (7.5 moles), 10 g. mercaptoethanol (0.13 mole), and 40 g. of 75% t-butyl peracetate (Lupersol 70), under a nitrogen sparge, over a period of 9.75 hours. The rate of addition is such as to prevent excessive monomer reflux at 140°–150° C. Fifteen minutes after the completion of the feed, 4.0 g. of 75% t-butyl peracetate (Lupersol 70) is added slowly to the flask to "chase" (i.e., to complete the reaction of) residual monomer. The reaction mixture is maintained at 150° for 15 minutes longer, then diluted with 140 g. of xylene and cooled to ambient temperature to give 1433 g. of product as a clear, light yellow solution at 73.4% solids in butyl Cellosolve (64%)/xylene (36%). According to a gel permeation chromatographic test, the $\overline{M}w$ of the oligomer is 7620 and the $\overline{M}n$ is 2650 ($\overline{M}w/\overline{M}n$ is 2.88).

(b) The amidation procedure of Example 1 (b) is repeated with 500.0 g. (3.4 mol, 73.4% solids in BC/xylene//64/36) of the oligomer prepared in part (a) hereof, 52.5 g. (0.51 mol) of diethylenetriamine, and 100 g. of xylene to provide a product with the following specifications (and having an amido-functionality of about 3.5):

| | |
|---|---|
| Solids (125° C./1 hr.) | 21 43.5% |
| Viscosity (Brookfield Spindle 4 at 0.6 RPM and 25° C.) | 555,000 cps. |
| Amine Equivalent Number | 870 |
| Acid Number | 11.8 |
| Total Titer | 1.36 meq/g |

EXAMPLE 5

A dp 26 oligomer of 68 wt. percent methyl methacrylate and 32 wt. percent butyl methacrylate is prepared by the method outlined in Example 1 (a). A total of 319.5 g. of butyl methacrylate, 675 g. of methyl methacrylate and 16 g. of methanol are used. The oligomer product (67.7% solids in xylene) has an $\overline{M}w$ of 3390 and an $\overline{M}n$ of 2880.

A mixture of a 590.8 g. portion of this oligomer solution, 55.6 g. of diethylenetriamine and 30 g. of butyl Cellosolve is heated at 140° C. in the manner described in Example 1 (b) for a reaction time of 22 hours. The polyamine isolated in aqueous solution has the following specifications:

| | |
|---|---|
| Amido functionality | 3.9 |
| Solids | 34.8% |
| Viscosity | >50,000 cps. |
| Amine Equivalent Weight | 1234 |
| Total Titer | 0.81 meq/g. |

EXAMPLE 6

(a) Preparation of 55 MMA/20 BMA/ 25 Styrene Poligomer of dp about 19

A 5-liter, 4-necked flask equipped with a thermometer, mechanical stirrer, nitrogen sparge, Friedrich condenser, 2000 ml. pressure-equalizing addition funnel and "Thermowatch" utilized with a pot lifter and heating mantle is charged with 500 g. of butyl Cellosolve. The flask is heated, under nitrogen, to 150° C. and to it then is slowly added a mixture of 1100 g. methyl methacrylate (11.0 moles), 400 g. of butyl methacrylate (2.82 moles), 500 g. of styrene (4.81 moles), 80 g. of Lupersol 70 (75% t-butyl peracetate in mineral spirits; 3% on monomers), and 20 g. of 2-hydroxyethyl mercaptan (1% on monomer) over a period of 9.25 hours. The resulting product is stirred 0.25 hours longer at 150° C. whereupon 8.0 g. of Lupersol 70 is gradually added over a period of 0.25 hours and the mixture is then held 1.0 hour longer at temperature to complete residual monomer chase. Product specifications: $\overline{M}w$: 4340; $\overline{M}n$: 2040; $\overline{M}w/\overline{M}n$=2.13; 80% solids in butyl Cellosolve.

(b) A 2-liter, 4-necked flask equipped with a thermometer, mechanical stirrer, nitrogen sparge, variable take-off distillation head, and "Thermowatch" utilized with a pot lifter and heating mantle is charged with 484.4 g. of the oligomer obtained in part (a) (0.19 mole, 80% solids in butyl Cellosolve), 79.8 g. of diethylenetriamine (0.77 mole), and 103.4 g. of xylene. The mixture is heated at 145° C., under nitrogen, for 14.5 hours at which point the residual amine titer is 62.4% of initial charge. Temperature is maintained by the continuous removal of solvent and by-products (methanol, butanol) during the course of the reaction. To the flask is then added sufficient deionized water to remove residual xylene by azeotropic distillation and reduce product solids to ~60%. The resulting acrylic polyamide has an amido functionality of ~4.1 and is recovered as a clear, light amber solution with the following specifications:

| | |
|---|---|
| Solids: 61.9% in butyl Cellosolve/water (36:64) | |
| Viscosity Spindle 4, 0.6 RPM; 25° C | 518,000 cps |
| Amine Equivalent Weight | 483 |
| Acid Number | 34.2 |
| Total Titer | 2.68 meq/g. |

EXAMPLE 7

(a) Preparation of 49 BA/34 MMA/17 AA Oligomer of dp is about 18

A 5-liter, 4-necked flask equipped with a thermometer, mechanical stirrer, nitrogen sparge, Friedrich condenser, monomer feed pump, 250 ml pressure-equalizing addition funnel, and "Thermowatch" utilized with a pot lifter and heating mantle is charged with 968.8 g. of butyl Cellosolve and heated, under nitrogen, to 140° C. (1) A mixture of 1254.4 g. of butyl acrylate (9.8 moles), 870.4 g. of methyl methacrylate (8.7 moles), 435.2 g. of acrylic acid (AA) (6.0 moles; 97.5% assay), and 51.2 g. of dodecyl mercaptan (2% on monomer), and (2) a solution of 102 g. of Lupersol 70 (75% t-butyl peracetate in mineral spirits; 3% on monomer) in 80 g. of butyl Cellosolve are then simultaneously added over a period of 5.0 hours. Upon completion of the two feeds, a solution of 34 g. of Lupersol 70 in 40 g. of butyl Cellosolve is added to the flask over a period of 1.0 hour and the reaction mixture is then held 0.5 hour without changing the temperature. Product specifications: $\overline{M}w$=5740; $\overline{M}n$=1970; $\overline{M}w/\overline{M}n$=2.91; 71.9% solids in butyl Cellosolve; Brookfield viscosity: 9200 cps (spindle 4, 30 RPM 25° C.); Acid Number: 75.2

(b) A 2-liter, 4-necked flask equipped with a thermometer, mechanical stirrer, nitrogen sparge, variable take-off distillation head, and "Thermowatch" utilized with a pot lifter and heating mantle is charged with 971.6 g. of the polymer of part (a) (0.355 mole, 71.9% solids in butyl Cellosolve) and heated under nitrogen to 65° C. To the flask is then added 129.4 g. of diethylenetriamine (1.26 mole) over a period of 10 minutes. A 25° exotherm results. The mixture is heated at 110° C. for 6.0 hours at which point the residual amine titer is 61% of initial charge. Sufficient deionized water is then added to remove butanol by azeotropic distillation and reduce products solids to 50–55%. The resulting acrylic polyamine has an amido-functionality of ~3.5 and is recovered as a light amber solution with the following specifications:

| Solids: 53.4% in butyl Cellosolve/water (43:57) | |
|---|---|
| Viscosity | |
| Spindle 4, 30 RPM, 25° C | 18,000 cps |
| Amine Equivalent Weight | 596.7 |
| Acid Number | 47.3 |
| Total Titer | 2.53 meq/g. |

EXAMPLE 8

A mixture of 304.4 g. of the oligomer of 75 methyl methacrylate/25 butyl methacrylate obtained in Example 1 (a), 46.5 g. of hexamethylenediamine (HD), 22 g. of butyl Cellosolve and 20 g. of toluene is heated at 135° C. for 21 hours; solvent is removed by distillation to maintain reaction temperature, and an additional 22 g. of butyl Cellosolve, 23.2 g. of ethylene glycol and 70 g. of xylene are added during the course of the reaction to reduce product viscosity. The product, which may be diluted with water, has a solids content of 58.8%, a calculated amido functionality of 2.4, and a titer of 1.70 meq/g.

EXAMPLE 9

A mixture of 608.8 g. of the oligomer of 75 parts methyl methacrylate/25 parts butyl methacrylate (Ex. 1 (a)), 105.1 g. of di(3-aminopropyl)-amine and 44 g. of butyl Cellosolve is heated at 135°–140° C. for 15 hours and at 145°–150° C. for 2 hours. To maintain reaction temperature, distillation is allowed to proceed; to control viscosity, 100 g. of xylene is added to replace solvent lost by distillation. The mixture is then cooled to 80° C. and 500 ml. of water is added with stirring. The polyamine product has 41.3% solids, a titer of 1.43 meq/g. and a calculated amido functionality of 2.4.

EXAMPLE 10

(a) Oligomeric methyl acrylate with $\overline{M}w$ of 1500 and $\overline{M}n$ of 800 is prepared as follows: A slurry of 53.8 g. of potassium tertiary-butoxide in 400 g. of toluene is stirred in a nitrogen atmosphere in a 3-liter, 3-necked flask equipped with stirrer, thermometer, condenser, and dropping funnel. A total of 2066 g. of methyl acrylate (MA) is added over two hours while external cooling is used to maintain a 70° C. reaction temperature. After an additional 4 hours at 70° C., 25.6 g. of concentrated sulfuric acid is added. Toluene and unreacted methyl acrylate are then removed at reduced pressure. Conversion of methyl acrylate to the oligomer characterized with $\overline{M}n$ 800 is 87%.

(b) Then, 516 g. of this methyl acrylate oligomer and 468.8 g. of ethylene diamine are heated in a stirred flask equipped for distillation. An initial amine titer of 16 meq/g. (in toluene/water, 1/1) is observed. The mixture is then heated until methanol refluxes vigorously; distillation of methanol is then allowed at a reaction temperature of 110° C. After 12 hours, 126 g. of methanol is collected. The pressure is reduced and ethylenediamine is distilled off, finally as a codistillate with water. A total of 107 g. of ethylenediamine is recovered. The reaction mixture is diluted with water to 73.2% solids and this solution has a titer of 7.31 meq/g.

EXAMPLE 11

Oligomeric methyl methacrylate of $\overline{M}w$ 750/$\overline{M}n$ 655 is prepared by the method of Example 8 of British Pat. No. 1,393,273. To 526.4 g. of this oligomer, 76% solids in toluene, is added 72.1 g. of ethylenediamine and 21 g. of methanol. The mixture is heated to 120° C. over 12 hours and then to 140° C. over another 12 hours. Distillation is allowed to proceed, and 75 g. of butyl Cellosolve and 7.5 g. of ethylenediamine are added to compensate for distillation losses. At the end of the heating period, the mixture is cooled to 80° C. and 250 ml. of water are added. The final polymer solution has a solids content of 57.0%, a titer of 1.51 meq/g., and a calculated amido functionality of 2.0

The following examples (12 to 29) concern use of the oligomeric aminolysis products in epoxide resin coating compositions.

EXAMPLE 12

Two package (A & B) amine functional acrylic/epoxide coating composition

A coating composition is prepared by mixing in conventional equipment the following materials:

| Materials | | Parts By Weight |
|---|---|---|
| A. | Amine functional acrylic (40.8% solids) of Example 1(b) | 125 |
| B. | Epoxide * | 49.0 |
| | Water | 123.2 |
| | Xylene | 10.0 |
| | TOTAL | 307.2 |
| | Reactive Solids Content (%) | 32.6 |
| | Useful Pot Life | 4 to 5 hrs. |

* A 100 % liquid epoxy resin blend of 85 parts of D.E.R. 331, a bisphenol-A/epichlorohydrin condensate available from Dow Chemical Co. and 15 parts of D.E.R 732, a polyglycol diepoxide available from Dow Chemical Co., the blend having a net epoxide equivalent weight of 199.

Steel panels are coated with the above composition after a 1-hour induction period to provide films of 1.5 mils when dry and are allowed to cure at 180° F. for 7 hours. On testing, the films show the following properties:

| Tukon Hardness (KHN) | 17.9 |
|---|---|
| Direct Impact (in-lb) | 20 |
| Chemical Resistance (30 min.): | |
| 10% acetic acid | very slight softening (v. sl. soft) |
| 10% HCl | no change (n.c.) |
| 10% NaOH | (n.c.) |
| Toluene | (n.c.) |
| 150° F. Water | (v. sl. soft) |

EXAMPLE 13

Two package (A & B) amine functional acrylic/epoxide coating composition

A coating composition is prepared by mixing in conventional equipment the following materials:

| Materials | Parts by Weight |
|---|---|
| A. Amine functional acrylic (34.8% solids) of Example 5 | 169.5 |
| B. Polyepoxide resin of Example 12 | 41.0 |
| Water | 172.6 |
| TOTAL | 383.1 |
| Reactive Solids (%) | 26.1 |
| Useful Pot Life | 3 days |

Steel panels are coated with the above composition after a 5-hour induction period to provide films of 1.4 mils when dry, and are allowed to cure at 180° F. for 7 hours. On testing, the films show the following properties:

| Tukon Hardness (KHN) | 15.2 |
|---|---|
| Direct Impact (in-lb) | 30 |
| Chemical Resistance (30 min.): | |
| 10% acetic acid | v. sl. soft |
| 10% HCL | n.c. |
| 10% NaOH | n.c. |
| Toluene | n.c. |
| Water (150° F.) | sl. soft |

EXAMPLE 14

Two package (A & B) amine functional acrylic/epoxide coating composition

A coating composition is provided by mixing in conventional equipment the following materials:

| Materials | | Parts by Weight |
|---|---|---|
| A. | Amine functional acrylic (43.5% solids) of Example 4 (b) | 128.7 |
| B. | Epoxy resin from Example 12 | 44.01 |
| | Water | 119.7 |
| | TOTAL | 292.4 |
| | Reactive Solids (%) | 34.2 |
| | Useful Pot Life | 4 hours |

Steel panels are coated with the above composition after a 2-hour induction period to provide films of 2.3 mils when dry, and are allowed to cure at 180° F. for 7 hours. On testing, the films show the following properties:

| Tukon Hardness (KHN) | 17.9 |
|---|---|
| Direct Impact (in-lb) | 12 |
| Chemical Resistance (30 min.): | |
| 10% acetic acid | n.c. |
| 10% hydrochloric acid | v. sl. whitening |
| 10% sodium hydroxide | n.c. |
| Toluene | n.c. |
| Water (150° F.) | sl. soft |

EXAMPLE 15

Pigmented Amine functional acrylic/epoxide coating composition

A TiO$_2$-pigmented two-package (A and B) amine/epoxide coating is prepared as follows, using the same epoxy resin as in Example 12.

| Materials Package A | Parts by Weight |
|---|---|
| Amine functional acrylic oligomer of Example I (b) | 343 |
| Rutile TiO$_2$ | 376.0 |
| Xylene | 49.5 |
| Defoamer | 3.7 |
| Water | 168.7 |

The above mixture is ground on a high-speed dispersing mill, such as a Cowles dissolver at 2200 RPM for 15 minutes. The above pigment dispersion is used in preparing a coating composition by mixing the following:

| Formulation of the Paint | | Parts |
|---|---|---|
| A. | Pigment dispersion above | 940.9 |
| B. | Epoxide resin (100%) | 178.4 |
| | Propylene glycol | 25.8 |
| | TOTAL | 1145.1 |
| | Pigment volume content (PVC) | 23.5% |
| | Pigment/binder | 11.8 |

-continued

| Formulation of the Paint | Parts |
|---|---|
| % weight solids | 60.7 |
| % volume solids | 46.0 |
| Viscosity | 80 Krebs units (KU) |
| Useful Pot Life | 4 hours |

The resulting paint is applied on an aluminum panel to form a film having a 1.6 mil dry thickness. On testing, the following properties are observed through 3 weeks cure under ambient conditions:

| Tack-free Time | 18 hours |
|---|---|
| Tukon Hardness (KHN) | 18.5 |
| Direct Impact (in-lb) | 3 |
| 60° Gloss | 84 |
| Chemical Resistance (30 min.): | |
| 10% acetic acid | moderate softening (mod. soft) |
| 10% hydrochloric acid | sl. soft. |
| 10% sodium hydroxide | n.c. |
| Toluene | n.c. |
| Water (150° F.) | mod. to sl. soft. |

EXAMPLE 16

Two package (A & B) amine functional acrylic/epoxide coating composition

A coating composition is prepared by mixing in conventional equipment the following materials:

| Materials | | Parts by Weight |
|---|---|---|
| A. | Amine functional acrylic (78.3% solids of Example 3 (b) | 62.6 |
| B. | Polyepoxide resin of Example 12 | 51.0 |
| | Butyl Cellosolve | 65.0 |
| | TOTAL | 178.6 |
| | Reactive Solids Content (%) | 56.0 |
| | Useful Pot Life | 7 hours |

Steel panels are coated with the above composition after a 1-hour induction period to provide films of 2.9 mils thickness when dry and are allowed to cure at 180° F. for 7 hours. On testing, the films show the following properties:

| Tukon Hardness (KHN) | 5.3 |
|---|---|
| Direct Impact (in-lb) | 120 |
| Reverse Impact (in-lb) | 60 |
| Chemical Resistance (30 min.): | |
| 10% acetic acid | sl. soft. |
| 10% HCl | n.c. |
| NaOH | n.c. |
| Toluene | mod. soft. |
| 150° F. water | v. sl. soft |

EXAMPLE 17

Two package (A & B) amine functional acrylic/epoxide coating composition

A coating composition is prepared by mixing in conventional equipment the following materials:

| | | Parts by Weight |
|---|---|---|
| A. | Amine functional oligomer (at 57.5% solids in BC) of Ex. 2 | 87.0 |
| B. | Polyepoxide resin of Example 12 | 50.0 |
| | Butyl Cellosolve | 4.6 |
| | TOTAL | 178.6 |

| | Parts by Weight |
|---|---|
| Reactive Solids Content (%) | 56.0 |
| Useful Pot-Life | 5–6 hours |

Steel panels are coated with the above composition after a 1-hour induction period to provide films of 3.1 mils when dry and are allowed to cure at 180° F. for 7 hours. On testing, the films show the following properties:

| | |
|---|---|
| Tukon Hardness (KHN) | 15.7 |
| Pencil Hardness | 2H–3H |
| Direct Impact (in-lb) | 25 |
| Reverse Impact (in-lb) | 2–4 |
| Chemical Resistance (30 min.) | |
| 10% acetic acid | sl. soft. |
| 10% HCl | n.c. |
| 10% NaOH | n.c. |
| Toluene | n.c. |
| 150° F. water | sl. embrittlement |

EXAMPLE 18

A solvent-based, two-package (A and B) amine functional acrylic/epoxide coating composition is prepared by mixing the following:

| | Parts |
|---|---|
| A. Amine functional acrylic resin of Example 2 | 53.9 |
| B. Epoxide resin (10%) * | 96.6 |
| Butyl Cellosolve | 47.5 |
| TOTAL | 200.0 |
| Reactive solids content (%) | 50.0 |
| Initial viscosity (centistokes) | 375 |
| Usable pot-life | 1 day |

* A solid diglycidyl ether bisphenol A di-epoxide having an epoxy equivalent weight of 450–550, and supplied at 70% solids in MEK/toluene = 1/1 (Shell Chemical Co. Epon$^R$ 1001-BT-70).
Note: MEK is methyl ethyl ketone.

Steel panels are coated with the above composition after a 1-hour induction period to provide films of 1.9 mils when dry, and are allowed to cure at 180° F. for 7 hours. On testing, the films show the following properties:

| | |
|---|---|
| Tukon Hardness (KHN) | 14.6 |
| Direct Impact (in-lb) | 100 |
| Reverse Impact (in-lb) | 25 |
| Chemical Resistance (30 min) | |
| 10% acetic acid | sl. soft. |
| 10% hydrochloric acid | n.c. |
| 10% NaOH | n.c. |
| Toluene | n.c. |
| 150° F. water | sl. soft. |

EXAMPLE 19

A two-package (A and B) amine functional acrylic/epoxide coating composition is prepared as follows: mix together

| | Parts |
|---|---|
| A. Amine functional acrylic resin of Example 2 | 92.15 |
| B. Diepoxide resin* | 47.00 |
| Butyl Cellosolve | 60.85 |
| TOTAL | 200.0 |
| Reactive solids content (%) | 50.00 |
| Initial viscosity (centistokes) | 275 |

| | Parts |
|---|---|
| Usable pot-life | 1 day |

*A 100% reactive difunctional epoxy resin based on hydantoin and bisphenol A which has a viscosity of 5000 cps. (25° C.) and an epoxide equivalent of 161 (Ciba-Geigy, XB-2826)

Steel panels are coated with the above composition after a 1-hour induction period to provide films of 1.7 mils thickness when dry, and are allowed to cure at 180° F. for 7 hours. On testing, the films show the following properties:

| | |
|---|---|
| Tukon Hardness (KHN) | 16.7 |
| Direct Impact (in-lb) | 30 |
| Reverse Impact (in-lb) | 2 |
| Chemical Resistance (30 min.) | |
| 10% acetic acid | mod. soft. |
| 10% hydrochloric acid | sl. - mod. soft. |
| 10% NaOH | n.c. |
| Toluene | n.c. |
| 150° F. water | sl. - mod. soft. |

EXAMPLE 20

A two-package (A and B) amine functional acrylic/epoxide coating composition is prepared by mixing the following:

| | Parts |
|---|---|
| A. Amine functional acrylic of Example 2 | 86.95 |
| B. Diepoxide resin* | 50.00 |
| Butyl Cellosolve | 63.05 |
| TOTAL | 200.00 |
| Reactive solids content (%) | 50.00 |
| Initial viscosity (centistokes) | 252 |
| Usable pot-life | 1 day |

*A liquid diglycidyl ether bisphenol A resin having a viscosity of 10,000–16,000 cps (25° C.) and an epoxide equivalent weight of 185–192 (Shell Chemical Co. Epon 828).

Steel panels are coated with the above composition after a 1-hour induction period to provide films of 1.7 mils when dry, and are allowed to cure at 180° F. for 7 hours. On testing, the films show the following properties:

| | |
|---|---|
| Tukon Hardness (KHN) | 15.9 |
| Direct Impact (in-lb) | 50 |
| Reverse Impact (in-lb) | 12 |
| Chemical Resistance-(30 min) | |
| 10% acetic acid | v. sl. soft. |
| 10% hydrochloric acid | n.c. |
| 10% NaOH | n.c. |
| Toluene | n.c. |
| 150° F. Water | sl. - v. sl. soft. |

EXAMPLE 21

A two-package (A and B) amine functional acrylic/epoxide coating is prepared by mixing the following:

| | Parts |
|---|---|
| A. Amine functional acrylic of Example 1 (b) (40.8% solids) | 147.05 |
| B. Epoxide resin * | 40.00 |
| Dipropylene glycol monomethyl ether | 4.00 |
| Phenyl Cellosolve | 6.55 |
| Propylene glycol | 4.00 |

-continued

| | Parts |
|---|---|
| Water | 84.10 |
| TOTAL | 285.70 |
| Reactive solids content (%) | 35.00 |
| Initial viscosity (cps) | 454 |
| Usable pot-life | 16 hours |

* A difunctional, liquid hydantoin epoxy resin having a viscosity of 2500 cps (25° C.), an epoxide equivalent weight of 138, and supplied at 100% solids (Ciba-Geigy, Epoxy XB-2793).

Steel panels are coated with the above composition after a 1-hour induction period to provide films of 1.3 mils thickness when dry, and are allowed to cure at 180° F. for 7 hours. On testing, the films show resistance to ultraviolet rays and the following properties:

| Tukon Hardness (KHN) | 17.9 | |
|---|---|---|
| Direct Impact (in-lb) | 16 | |
| Chemical Resistance (30 min.) | | |
| 10% acetic acid | complete failure | |
| 10% hydrochloric acid | complete failure | |
| 10% NaOH | moderate softening | |
| Toluene | n.c. | |
| 150° F. Water | sl. soft., 8-9MD blisters ** | |

** According to A.S.T.M. Test Method, part 27 D-714

EXAMPLE 22

A two-package (A and B) amine functional acrylic-/epoxide coating is prepared by mixing the following:

| Materials | Parts | |
|---|---|---|
| A. Amine functional acrylic of | | |
| Example 1 (b) | 147.05 | |
| B. Epoxide resin * | 44.00 | |
| Dipropylene glycol monomethyl ether | 4.00 | |
| Phenyl Cellosolve | | |
| Propylene Propylene glycol | 4.00 | |
| Water | 84.10 | |
| TOTAL | 289.70 | |
| Reactive solids content (%) | 35.90 | |
| Initial viscosity (cps) | 1624 | |
| Gel time | >3 weeks | |

* A cycloaliphatic diepoxide having a viscosity of 275 cps (25° C.), an epoxide equivalent weight of 139, and supplied at 100% solids (Ciba-Geigy, Araldite CY-179).

Steel panels are coated with the above composition after a 1-hour induction period to provide films of 1.2 mils when dry, and are allowed to cure at 180° F. for 7 hours. On testing, the films show the following properties:

| Tukon Hardness (KHN) | 15.6 |
|---|---|
| Direct Impact (in-lb) | 4 |
| Chemical Resistance (30 min.) | |
| 10% acetic acid | complete failure |
| 10% hydrochloric acid | severe softening |
| 10% NaOH | n.c. |
| Toluene | n.c. |
| 150° F. Water | severe soft., 9F-M blisters |

EXAMPLE 23

Pigmented amine functional acrylic/epoxide coating composition.

A TiO$_2$-pigmented two-package (A and B) amine/epoxide coating is prepared as follows:

| | Parts |
|---|---|
| A. Amine functional acrylic oligomer of | |
| Example 1 (b) | 400.0 |

-continued

| | Parts |
|---|---|
| Rutile TiO$_2$ | 687.8 |
| Xylene | 85.0 |

The above mixture is ground on a Cowles pigment disperser at 2200 F.P.M. for 25 minutes. The above pigment dispersion is used in preparing a coating composition by mixing the following:

| | Parts |
|---|---|
| Pigment dispersion | 1172.8 |
| Amine functional acrylic oligomer of | |
| Example 1(b) | 313.4 |
| Defoamer | 8.5 |
| Water | 808.1 |
| Surfactant (Tamol 731) | 10.8 |
| Glycol ether | 40.6 |
| Propylene glycol | 40.6 |
| Phenylene Cellosolve | 66.8 |
| B. { Diepoxide I* | 227.2 |
| Diepoxide II** | 41.5 |
| TOTAL | 2730.3 |
| Properties of Paint: | |
| Pigment volume concentration (PVC) | 24.00 |
| Pigment/binder | 1.23 |
| % Weight solids | 45.69 |
| % Volume solids | 31.77 |
| Viscosity | 83 KU |
| Gel time | 16 hours |

*A liquid diglycidyl ether bisphenol A epoxy resin having a viscosity of 11,000–14,000 cps (25° C.), an epoxide equivalent weight of 186–192, and supplied at 100% solids (Dow Epoxy Resin 331).
**A liquid polyglycol diepoxide having a viscosity of 55–100 cps (25° C.), an epoxide equivalent weight of 305–335, and supplied at 100% solids (Dow Epoxy Resin 732).

The resulting paint is applied to steel panels to form a film of 1.3-mil dry thickness. On testing, the following properties are observed through 9 days cure under ambient conditions:

| Tack-free time | <16 hours |
|---|---|
| Tukon Hardness (KNH) | 15.7 |
| 60° Gloss | 90 |
| Chemical Resistance (30 min.) | |
| 10% acetic acid | severe soft., 9MD blisters |
| 10% hydrochloric acid | v. sl. softening |
| 10% NaOH | n.c. |
| Toluene | n.c. |
| 150° F. Water | v. sl. softening |

EXAMPLE 24

A water-based two-package (A and B) amine functional acrylic/epoxide coating composition is prepared by mixing the following:

| | Parts |
|---|---|
| A. Amine functional acrylic of | |
| Example 7 (b) 53.4% solids | 93.0 |
| B. { Epoxide I used in Example 23 | 43.1 |
| Epoxide II used in Example 23 | 7.9 |
| Propylene glycol | 4.0 |
| Dipropylene glycol monomethyl ether | 4.0 |
| Phenyl Cellosolve | 6.6 |
| Water | 174.8 |
| TOTAL | 333.4 |
| Reactive solids content (%) | 30.0 |
| Initial viscosity (cps) | 3100 |
| Usable pot-life | 16 hours |

Steel panels are coated with the above composition after a 1-hour induction period to provide films of 1.6 mils when dry, and are allowed to cure at 180° F. for 7 hours. On testing, the films show the following properties:

| | |
|---|---|
| Tukon Hardness (KHN) | 13.6 |
| Direct Impact (in-lb) | 50 |
| Reverse Impact (in-lb) | 12 |
| Chemical Resistance (30 min.) | |
| 10% acetic acid | sl. soft. |
| 10% hydrochloric acid | n.c. |
| 10% NaOH | n.c. |
| Toluene | v. sl. soft. |
| 150° F. Water | sl. soft. |

EXAMPLE 25

Ketone-modified, two-package acrylic amine/epoxide systems with improved pot life.

A pigment is prepared by mixing the following:

| | Parts By Weight |
|---|---|
| Amidation product of Ex. 1(b) | 700.0 |
| Rutile TiO₂ | 1490.1 |
| Defoamer (e.g. Dee Fo 806-102, or Balab 618) | 18.5 |
| Solvesso 100 | 184.1 |
| Water | 403.5 |
| | 2796.2 | and grinding at 4400 rpm for 25 minutes on a Cowles dissolver. This pigment dispersion is combined with the following:

| | Parts By Weight |
|---|---|
| Amidation product of Ex. 1(b) | 752.9 |
| Water | 740.9 |
| TOTAL = | 4290.0 | to form a complete pigment base.

Two-package acrylic amine/epoxide paints are prepared on conventional equipment by mixing the following:

| | Parts By Weight | | |
|---|---|---|---|
| Package A | A | B | C |
| Pigment base prepared above | 180.0 | 180.0 | 180.0 |
| Monomethyl ether of dipropylene glycol | 3.7 | 3.7 | 3.7 |
| Phenyl Cellosolve | 6.1 | 6.1 | 6.1 |
| Propylene glycol | 3.7 | 3.7 | 3.7 |
| Emulsifier (e.g. Triton X-405 or Dion 37) | 1.0 | 1.0 | 1.0 |
| 2-octanone | 9.2 | — | — |
| Methyl ethyl ketone | — | 5.1 | — |
| Water | 42.0 | 46.0 | 51.2 |
| Package B - Epoxide | 24.4 | 24.4 | 24.4 |
| (same as in Ex. 12) Total = | 270.1 | 270.1 | 270.1 |
| Properties | | | |
| Wt. Solids (%) | 42.0 | 42.0 | 42.0 |
| PVC | 24.0 | 24.0 | 24.0 |
| Volume solids (%) | 28.7 | 28.7 | 28.7 |
| Pigment/binder | 1.23 | 1.23 | 1.23 |
| Initial viscosity (KU) | 71 | 65 | 62 |
| Average viscosity increase (KU/hour) | 4.8 | 5.9 | 7.0 |

The resulting paints are applied on steel panels after a 3-hour indication period to provide 1.5 mil dry films and are allowed to cure 3 weeks at ambient conditions. On testing, the film all show essentially identical properties, viz.,

| | |
|---|---|
| Tack-free time | 16 hours |
| Tukon Hardness (KHN) | 15-17 |
| 60° Gloss | 86-89 |
| Chemical Resistance (30 min.) | |
| 10% hydrochloric acid | v. sl. softening |
| 10% NaOH | NC |
| Toluene | NC |
| 150° F. water | v. sl. softening |

The substitution of volatile aldehydes, such as butyraldehyde or benzaldehyde for the ketones used in the three paints of this Example 25 gives similar results in the controlling the rate of viscosity increase.

EXAMPLE 26

Example 16 is repeated replacing the amidation product (Ex. 3(b)) therein used with 24 parts of the 73.2% solids solution of amidation product obtained in example 10(b) hereinabove. The composition is applied to coat steel panels and cured as in Example 16. Similar properties are obtained.

EXAMPLE 27

Example 12 is repeated except that the amidation product (Ex. 1(b)) is replaced with 150 parts of the 58.8% solids solution of amidation product obtained in Example 8. Similar properties are obtained from the coatings cured as disclosed hereinabove to form dry films having comparable thickness.

EXAMPLE 28

The procedure of Example 13 is repeated using the amidation product of Example 11 (91 parts of the 57% solids solution) instead of the amidation product of Example 5. Similar properties are obtained in the cured films.

EXAMPLE 29

Similar results in film properties are obtained by the procedures of Examples 12, 15, 21, 22, and 23 when cured films are produced from compositions described in the examples except for the substitution of an equivalent amount of the amidation product of Example 9 for the amidation product of Example 1(b) used in these coating compositions.

We claim:

1. A solid product of aminolysis by an alkylene polyamine of the formula:

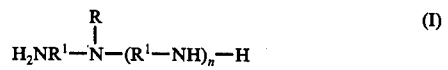
(I)

wherein
   R¹ is an alkylene group having 2 to 6 carbon atoms,
   R is H or R¹NH₂, and
   n is 0 or an integer from 1 to 4, of an alkyl methacrylate ester oligomer having a number average molecular weight from about 600 to 10,000, selected from the group consisting of:
   (1) homopolymers of a (C₁-C₄) alkyl methacrylate and
   (2) copolymers exclusively of at least two alkyl methacrylates in which a (C₁-C₄) alkyl methacrylate is the major component,
the product having N-amino-substituted methacrylamide units of the formula:

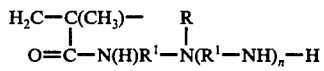

wherein $R^1$, $R$, and $n$ are as defined hereinabove, in the oligomer chain.

2. A solid product according to claim 1 having 0.5 to 10 milliequivalents of amine per gram thereof.

3. A solid product of aminolysis, by a polyamine of formula I as defined in claim 1, of a vinyl oligomer having a number average molecular weight from about 600 to about 10,000 selected from the group consisting of:
   (1) homopolymers of a ($C_1$-$C_4$) alkyl methacrylate,
   (2) copolymers of at least two alkyl methacrylates in which a ($C_1$-$C_4$) alkyl methacrylate is the major component,
   (3) homopolymers of a ($C_1$-$C_4$) alkyl acrylate,
   (4) copolymers exclusively of at least two alkyl acrylates in which a ($C_1$-$C_4$) alkyl acrylate is the major component,
   (5) copolymers of an alkyl acrylate with an alkyl methacrylate containing at least 35 mole percent of at least one ($C_1$-$C_6$) alkyl acrylate or methacrylate, and
   (6) copolymers of (a) at least one monomer selected from alkyl acrylates and alkyl methacrylates with (b) at least one monomer selected from acrylic acid, methacrylic acid, styrene, and vinyltoluene, such copolymers containing at least 35 mole percent of at least one ($C_1$-$C_6$) alkyl acrylate or methacrylate, the product having N-amide-substituted amide units of the formula:

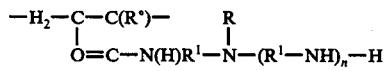

wherein
   $R_o$ is H or $CH_3$,
   $R^1$ is an alkylene group having 2 to 6 carbon atoms, and
   $R$ is H or $R^1NH_2$, and
   $n$ is 0 or an integer from 1 to 4 and also having carboxylic units selected from methacrylic acid and acrylic acid units in the oligomer chain, the product having 0.5 to 10 milliequivalents of amine per gram and 0.25 to 5 milliequivalents of carboxylic acid per gram, at least some of the carboxylic acid units being in the form of an internal salt of amino groups on the amide units.

4. A solid product according to claim 3 in which a substantial portion of the oligomer chain consists of hydrophobic units of styrene or vinyltoluene inert to hydrolysis or aminolysis.

5. A coating composition having a binder consisting essentially of (a) a product of aminolysis by an alkylene polyamine of the formula

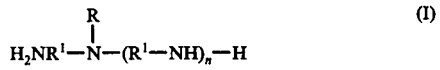 (I)

wherein
   $R^1$ is an alkylene group having 2 to 6 carbon atoms,
   $R$ is H or $R^1NH_2$, and
   $n$ is 0 or an integer from 1 to 4, of a vinyl oligomer having a number average molecular weight from about 600 to about 10,000 selected from the group consisting of
   (1) homopolymers of a ($C_1$-$C_4$) alkyl methacrylate,
   (2) copolymers of at least two alkyl methacrylates in which a ($C_1$-$C_4$) alkyl methacrylate is the major component,
   (3) homopolymers of a ($C_1$-$C_4$) alkyl acrylate,
   (4) copolymers exclusively of at least two alkyl acrylates in which a ($C_1$-$C_4$) alkyl acrylate is the major component,
   (5) copolymers of an alkyl acrlate with an alkyl methacrylate containing at least 35 mole percent of at least one ($C_1$-$C_6$) alkyl acrylate or methacrylate, and
   (6) copolymers of (a) at least one monomer selected from alkyl acrylates and alkyl methacrylates with (b) at least one monomer selected from acrylic acid, methacrylic acid, styrene, and vinyltoluene, such copolymers containing at least 35 mole percent of at least one ($C_1$-$C_6$) alkyl acrylate or methacrylate, the product having N-amine-substituted amide units of the formula

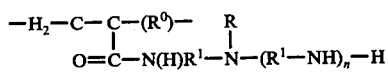

wherein
   $R_o$ is H or $CH_3$,
   $R^1$ is an alkylene group having 2 to 6 carbon atoms, and
   $R$ is H or $R^1NH_2$, and
   $n$ is 0 or an integer from 1 to 4 and also having carboxylic units selected from methacrylic acid and acrylic acid units in the oligomer chain, the product having 0.5 to 10 milliequivalents of amine per gram and 0.25 to 5 milliequivalents of carboxylic acid per gram, at least some of the carboxylic acid units being in the form of an internal salt of amine groups on the amide units and (b) a resin-forming polyepoxide, the proportion of aminolysis product used in the composition providing from 25 to 75 equivalents of amine with respect to 75 to 25 equivalents of epoxide groups provided in the polyepoxide.

6. A composition according to claim 5 adapted to preparation and distribution as a two-package system in which one package contains the aminolysis product and the other comprises the resin-forming polyepoxide.

7. A composition according to claim 5 comprising a water-immiscible solvent for the aminolysis product and the polyepoxide.

8. A composition according to claim 5 comprising a water-miscible solvent for the aminolysis product and the polyepoxide.

9. A composition according to claim 5 which contains a volatile aldehyde or ketone as at least part of the solvent thereof.

10. A composition according to claim 6 wherein the package containing the aminolysis product also contains a volatile ketone or aldehyde.

11. A solid product according to claim 2 wherein it also contains in the oligomer chain 0.25 to 5 milliequivalents of carboxyl per gram, at least some of the carboxyl being in the form of an internal salt of amine groups on the amide units.

12. A coating composition having a binder consisting essentially of a product of aminolysis by an alkylene polyamine of the formula

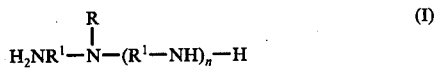

wherein
R¹ is an alkylene group having 2 to 6 carbon atoms,
R is H or R¹NH₂, and
n is 0 or an integer from 1 to 4, of an alkyl methacrylate ester oligomer having a number average molecular weight from about 600 to 10,000, selected from the group consisting of:
(1) homopolymers of a ($C_1$-$C_4$) alkyl methacrylate and
(2) copolymers exclusively of at least two alkyl methacrylates in which a ($C_1$-$C_4$) alkyl methacrylate is the major component,
the product having N-amino-substituted methacrylamide units of the formula

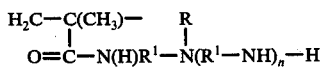

wherein R¹, R, and n are as defined hereinabove, in the oligomer chain and (b) a resin-forming polyepoxide, the proportion of aminolysis product in the composition providing 25 to 75 equivalents of amine and the polyepoxide providing 75 to 25 equivalents of epoxide groups.

13. A coating composition according to claim 12 in which the product of aminolysis has 0.5 to 10 milliequivalents of amine per gram thereof.

14. A coating composition according to claim 5 in which a substituted portion of the oligomer chain consists of hydrophobic units of styrene or vinyltoluene inert to hydrolysis or aminolysis.

15. A coating composition according to claim 13 in which the product of aminolysis contains 0.25 to 5 milliequivalents of carboxyl per gram, at least some of the carboxyl being in the form of an internal salt of amine groups on the amide units.

16. An aqueous coating composition according to claim 13 adapted to be used as an adhesive or as a protective coating in which the aminolysis product is water-dispersible and the polyepoxide is a water-dispersible resin-forming polyepoxide containing at least two vic-epoxy groups and having an epoxy equivalency of about 100 to 1025.

17. An aqueous coating composition according to claim 14 adapted to be used as an adhesive or as a protective coating in which the aminolysis product is water-dispersible and the polyepoxide is a water-dispersible resin-forming polyepoxide containing at least two vic-epoxy groups and having an epoxy equivalency of about 100 to 1025.

18. An aqueous coating composition according to claim 5 adapted to be used as an adhesive or as a protective coating in which the aminolysis product is water-dispersible and the polyepoxide is a water-dispersible resin-forming polyepoxide containing at least two vic-epoxy groups and having an epoxy equivalency of about 100 to 1025.

* * * * *

UNITED STATES PATENT AND TRADEMARK OFFICE
CERTIFICATE OF CORRECTION

PATENT NO. : 4,120,839
DATED : October 17, 1978
INVENTOR(S) : WILLIAM D. EMMONS; TRAVIS E. STEVENS It is certified that error appears in the above-identified patent and that said Letters Patent are hereby corrected as shown below:

Claim 1, replace lines 8-11, (Col. 22, lines 58-61) with the following:

-- n is 0 or an integer from 1 to 4, of an alkyl methacrylate ester oligomer having a number average molecular weight of from about 600 to 10,000, selected from the group consisting of:--

Claim 1, lines 19-20, (Col. 23, lines 1-2), correct the formula to read

Claim 3, lines 27-28, (Column 23, between lines 35-40), correct the formula to read:

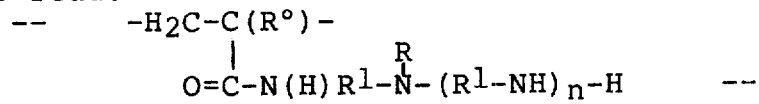

Claim 3, replace lines 34-41, (Col. 23, lines 46-53), with the following:

-- n is 0 or an integer from 1 to 4 and also having carboxylic units selected from methacrylic acid and acrylic acid units in the oligomer chain, the product having 0.5 to 10 milliequivalents of amine per gram and 0.25 to 5 milliequivalents of carboxylic acid per gram, at least some of the carboxylic acid units being in the form of an internal salt of amino groups on the amide units.--

UNITED STATES PATENT AND TRADEMARK OFFICE
CERTIFICATE OF CORRECTION

PATENT NO. : 4,120,839
DATED : October 17, 1978
INVENTOR(S) : William D. Emmons et al.

It is certified that error appears in the above-identified patent and that said Letters Patent are hereby corrected as shown below:

Claim 5, replace lines 9-12, (Col. 24, lines 1-4) with the following:

-- $n$ is 0 or an integer from 1 to 4 of a vinyl oligomer having a number average molecular weight from about 600 to about 10,000 selected from the group consisting of--

Claim 5, lines 34-35, (Col. 24, lines 26-30), correct the formula to read:

Claim 5, replace lines 41-53, (Col. 24, lines 37-48) with the following:

-- $n$ is 0 or an integer from 1 to 4 and also having carboxylic units selected from methacrylic acid and acrylic acid units in the oligomer chain, the product having 0.5 to 10 milliequivalents of amine per gram and 0.25 to 5 milliequivalents of carboxylic acid per gram, at least some of the carboxylic acid units being in the form of an internal salt of amine groups on the amide units and (b) a resin-forming polyepoxide, the proportion of aminolysis product used in the composition providing from 25 to 75 equivalents of amine with respect to 75 to 25 equivalents of epoxide groups provided in the polyepoxide.--

Claim 12, replace lines 9-12, (Col. 25, lines 15-18), with the following:

-- $n$ is 0 or an integer from 1 to 4, of an alkyl methacrylate ester oligomer having a number average molecular weight from about 600 to 10,000, selected from the

UNITED STATES PATENT AND TRADEMARK OFFICE
CERTIFICATE OF CORRECTION

PATENT NO. : 4,120,839

DATED : October 17, 1978

INVENTOR(S) : William D. Emmons et al.

It is certified that error appears in the above—identified patent and that said Letters Patent is hereby corrected as shown below:

group consisting of: --.

Claim 12, lines 20-21, (Col. 25, lines 28-30), correct the formula to read:

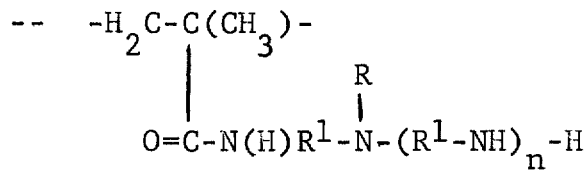

Signed and Sealed this

Twenty-fifth Day of May 1982

[SEAL]

Attest:

Attesting Officer

GERALD J. MOSSINGHOFF

Commissioner of Patents and Trademarks